United States Patent

[11] 3,622,290

| [72] | Inventors | Jerome P. Klink;<br>Charles R. Morrison, both of Newark, Ohio |
|---|---|---|
| [21] | Appl. No. | 773,027 |
| [22] | Filed | Nov. 4, 1968 |
| [45] | Patented | Nov. 23, 1971 |
| [73] | Assignee | Owens-Corning Fiberglas Corporation |

[54] METHOD OF MAKING, SUPPLYING AND APPLYING CHEMICAL TREATMENT TO GLASS FIBERS
3 Claims, 3 Drawing Figs.

[52] U.S. Cl. .................................................. 65/3,
65/11W, 117/126, 222/92
[51] Int. Cl. ............................................. C03c 25/02
[50] Field of Search .......................................... 117/126,
126 GR; 222/92, 190, 333; 65/3, 11, 11 W;
252/315

[56] References Cited
UNITED STATES PATENTS

| 2,907,626 | 10/1959 | Eisen et al. ..................... | 65/3 |
| 3,365,326 | 1/1968 | Conrad ........................... | 65/3 X |
| 3,377,002 | 4/1968 | Weber ........................... | 222/333 |
| 3,414,956 | 12/1968 | Genson ........................... | 65/3 |
| 3,422,993 | 1/1969 | Boehm et al. ..................... | 222/190 |
| 3,462,254 | 8/1969 | Marzocchi et al. ............... | 65/3 |
| 3,498,262 | 3/1970 | Hill et al. ....................... | 117/126 X |

OTHER REFERENCES
Starch and Its Derivatives, 3rd Edition, Vol. II, Radley, pp. 303- 305.

*Primary Examiner*—S. Leon Bashore
*Assistant Examiner*—Robert L. Lindsay, Jr.
*Attorneys*—Staelin & Overman and Daniel D. Mast ABSTRACT: A new and improved method for preparing and applying sheer thinning gel to glass fibers wherein the improvement comprises introducing the treatments, after preparation, into closed collapsible containers, controllably advancing the treatments to an application zone, and applying the treatments uniformly to the glass fibers.

JEROME P. KLINK &
CHARLES R. MORRISON
INVENTORS

BY

Staelin & Overman
ATTORNEYS

JEROME P. KLINK &
CHARLES R. MORRISON
INVENTORS

BY

Staelin & Overman
ATTORNEYS

METHOD OF MAKING, SUPPLYING AND APPLYING CHEMICAL TREATMENT TO GLASS FIBERS

BACKGROUND OF THE INVENTION

This invention relates to the preparation and application of chemical treatments for glass fibers; more specifically it relates to a supply and delivery system of the treatment so that the latter is protected from contaminants, bacteria, fungi, and oxidation.

In the past, chemical treatments were made up in advance of their being applied to glass fibers, but problems inherent with this method were contamination by dirt and glass particles, destruction by bacteria and fungi, and oxidation of the treatment itself. These contaminants tended to foul the pumping units used to convey the treatment to applicators for application to glass fibers. Furthermore, when these contaminants advanced to the applicators, the latter would be void of the treatment, thereby leaving the glass fibers unprotected. The application efficiency of the treatment to the glass fiber filaments would then be impaired because ""breakouts" in glass fiber strands would result due to a lack of the treatment thereon. A similar situation was presented when the chemical treatment oxidized and small particles therefrom passed through the pumping units and advanced to the applicators. Destruction of the treatment by bacteria or fungi meant that the treatment had to be disposed of and the pumping system thoroughly cleaned thereby decreasing efficiency. However, if the treatment developed bacteria or fungi after application to glass fibers or fabric, the loss was even greater since the latter had to be discarded. When however, a method according to the inventive concept is used, the problems of contamination by dirt and glass particles, destruction by bacteria or fungi and oxidation of the treatment itself, are substantially eliminated, hereinafter described in greater detail.

Our chemical treatments are applied to glass fibers as they are being formed in order to obtain an integral strand that will withstand postforming operations, e.g. twisting, quilling, weaving, etc. The chemical treatment comprises a reversible shear-thinning gel composition which is fed to a device comprising a feed supply line, a chamber which receives material from the feed line, and a rotating roll which forms a narrow slot with the chamber in order for the roll to obtain a uniform coating of the treatment. The roll may be optionally driven by a motor to control the r.p.m. thereof instead of by the glass fibers passing over and in contact therewith. In this manner the roll speed is slower than the rate of the fibers being formed so that the latter skid somewhat over the roll and thereby help to supply stress to the reversible shear-thinning gel.

The instant invention as disclosed and illustrated hereinafter shows improvements in the application of a coating material or chemical treatment to a group of continuous glass filaments or fibers which are simultaneously produced and then laterally grouped together to form a continuous glass fiber strand. Continuous glass fiber strands are produced commercially by maintaining a supply of molten glass in a glass "-bushing" which has a plurality of minute orifices distributed over the bottom surface thereof. A fine stream of molten glass flows through each of the orifices, and due to the great increase in surface area of the glass as it is attenuated into fibers, the fibers are cooled to a degree that chemical treatments can be applied thereto shortly after formation. The many filaments that are formed from a single bushing extend in the shape of a fan to a guide or gathering shoe and proceed to a gathering roll or forming package in the form of a strand.

In order to insure the application of a chemical treatment (sizes, lubricants, etc.) to each of the glass filaments making up a strand, applicators comprising various designs have been developed and employed. These applicators transfer the chemical treatment to the individual filaments before they are gathered into a strand or at the point where they are gathered into a strand. However, it is preferable to apply the treatment to the individual filaments before the formation of a strand.

It is desirable and necessary when applying chemical treatments to glass fibers that a uniform coating be applied. Uniformity is desirable and necessary because of subsequent operations through which the treated glass fibers or strands are subjected, such as twisting, quilling, weaving, heat-cleaning, dyeing, etc. Without uniformity in application of sizes to glass fibers, control over the quality of fibers making up finished products is adversely affected. Uniformity of coating with the inventive concept is much greater than that obtainable heretofore, because of the preciseness and cleanliness by which the treatment is delivered to the application zone. Furthermore, the use of a precision gear pump for a uniform, accurate delivery of the treatment at variable flow rates eliminates any pulsations that might cause variations in strand solids. Straining is necessary to eliminate any contaminants since the tolerances of the pumps are small. A more continuous operation is realized with our inventive concept because all foreign matter is kept out of the treatment from preparation to the time it is applied to the glass fibers, thereby eliminating fouling of the gear pump.

The improvements in the application of a chemical treatment to glass fibers according to our invention substantially eliminates contaminants and reduces bacteria and micro-organisms from entering the treatment before or after application to glass fibers and further prevents oxidation of the treatment before application. Another improvement is the preciseness by which the treatment, preferably in a gelled form, is fed to the applicator thereby insuring uniformity in coating the glass fibers.

Heretofore when chemical treatments, liquid or gelled, were applied to glass fibers, their manner of delivery to the applicators subjected the treatments to contamination from the environment, to bacteria and fungi, and to oxidation, all of which adversely affected the quality of the treated fibers or strands.

It is therefore an object of the present invention to provide apparatus for preparing, supplying, delivering and applying chemical treatments to glass fibers.

It is a further object of this invention to provide apparatus that houses and protects chemical treatments for glass fibers from contaminants, bacteria, fungi, and oxidation.

It is still another object to provide means for delivery of chemical treatments to an applicator with preciseness and free from contaminants.

Other objects and advantages will be apparent from the following description.

SUMMARY OF THE INVENTION

It has been discovered that by providing a closed system for chemical treatments for subsequent application to glass fibers, from the time of straining the treatment after preparation thereof to the time of application to the glass fibers, a high degree of coating uniformity is obtained. Uniform coating of glass fibers becomes especially important in postforming operations such as twisting, plying, beaming, quilling, weaving, dyeing, coronizing, etc., wherein fuzz or "breakouts" appear as defects in the glass yarns or fabrics as a result of lack of protection of individual filaments from self-abrasion, i.e., where no chemical treatment has reached particular glass fibers in a strand. Another problem, that arises when there is a nonuniform application of the chemical treatment to glass fibers at forming, occurs in the heat-cleaning operation of fabrics, wherein streaks may be left in the fabric because of a heavier buildup of treatment on portions thereof.

It has always been of major concern to manufacturers of glass fibers to control the amount of chemical treatment or size that is applied to glass fibers in the forming operation while at the same time controlling the application efficiency*

---
* Application efficiency as used herein means the amount of chemical treatment actually coating the glass fibers as compared to the amount that is used for coating the fibers, generally expressed as a percentage. of the size to the glass fibers. By gelling the size and depending on the movement of fibers therethrough for a reversible shear-thinning action to liquify the gelled size, control over application efficiency has been realized because there is no loss of the treatment during application thereof. By controlling the rate of delivery of the size to the applicator, such as by metering, preciseness is now realized.

The gel compositions used as chemical treatments for glass fibers have a reversible shear-thinning property so that the composition, after delivery to an applicator, flows and coats glass fibers passing over and in contact therewith because of a shearing effect created by the fast moving fibers, and subsequently, almost immediately, the coating on the fibers reverts back to the gel form.

When a delivery system, according to the inventive concept is used to supply a chemical treatment to an applicating zone for coating glass fibers, a more uniform strand solids, i.e., the amount of chemical treatment picked up by the strand, is obtained. There is consistency in the solids level of the coating on the strand throughout the forming package which comprises a collection of continuously formed strands.

Without this consistency in the solids level of the coated strand, shortcomings in postforming operations appear. For example, in fabrics and weavers' products, fuzz, discoloration after heat-cleaning and discoloration after dyeing appear, thereby discrediting the quality of the product. In reinforcements, when glass fibers do not have a uniform coating of a sizing thereon, the subsequent wet-out required for high strength, high quality reinforcement is adversely affected, thereby downgrading the function of the glass fibers as a reinforcement. All of the above shortcomings are overcome when glass fibers are treated according to the inventive concept.

By using a reversible shear-thinning gel composition as a sizing material for glass fibers, the application operation is much cleaner and more efficient since the composition reverts back to its gel state after coating the fibers and before being wound onto a forming package. However, the use of a gel composition for glass fibers is not without its problems; it must be metered onto an applicator uniformly, the best known way being that described herein.

Our delivery system of the gel composition to the applicating zone provides a more mechanically reliable system that is easier to handle and that is more flexible than prior delivery systems. Higher application efficiencies, less mess and a savings on materials is realized by our system.

Basically our delivery system comprises a one-way supply and delivery system of a chemical material to an application zone wherein glass filaments, subsequent to forming, are treated so that they may withstand postforming operations. After the chemical material has been prepared and put into a closed container, the material may be stored or at any time drawn out of the container by means of a positive-flow displacement pump.

Because the positive displacement pumps that have been used have very small tolerances, contamination of the chemical material from the environment, such as dirt or glass particles or oxidized particles from the chemical material, must be eliminated in order to insure uniform metering of the material to the applicators. To obtain a sizing material free from contaminants at the applicating zone, it is preferable to use a collapsible container, such as a polyethylene bag where flexibility in the supply of different sizes to an applicator is required. However, where this flexibility is not required a closed container such as a stainless steel vessel is adequate.

In our system, as the bag is filled, air vents therefrom, so that when the bag is filled substantially less than 1.0 percent by volume of air remains in the bag. A close analogy is that of a balloon filled with a liquid except that polyethylene does not stretch like a balloon. After the bags are filled they must be transported to a storage area or to the pumping area. This is done by using a carriage into which the bag is fitted before filling. To reduce stresses set up in the bag because of it being filled, the bag must be large enough to be in excess of the confines of the carriage. The bag is equipped with a fitting on the bottom thereof, which passes through the bottom of the carriage, to allow the material therein to be withdrawn. The fitting consists of a flanged nipple adaptable to receive a flexible tubing so that the latter can be attached to a manifold line which supplies an unlimited number of pumps, depending upon the rate of supply to and the rate of withdrawal from the manifold.

The only piping system required for our gelled chemical treatment is from the pumps to the applicators, whereas when liquid treatments were used a more complex piping system was required. Heretofore when a different sizing material was desired on different applicators aligned in a bank or row, a separate piping system was required, which involved separate overflow tanks and return lines. However, when gel sizes are delivered to the applicators via our method, the piping is much simpler and no overflow tanks and no return lines are required.

Heretofore, when the chemical material to be used as a sizing for glass filaments was in a liquid form, bacterial contamination of the material was a major problem. If bacteria invaded the material before application to glass fibers, the material had to be discarded. Conversely, if the material became inflicted with bacteria after application thereof to glass fibers, it rendered the latter unusable. This problem is greatly reduced and substantially eliminated when a supply and delivery system according to our concepts is used. Since the chemical material is in gel form, a positive displacement pump can be employed. When the material is in liquid form, this is not feasible since return lines are required to return overflow of material in the applicating zone back to the pumping station. Recycling of liquid treating material exposes the overflow and the unpumped material to possible contamination.

However, when the chemical material is in gel form, the bacteria can feed not only on the starch but also on the gelling agent. Therefore, it is imperative that a completely closed system be used from the time of preparation of the material to the time of delivery to the applicating zone in order to reduce formation of bacteria. After the glass filaments are sized with the chemical treatment, they are gathered into a strand and wound onto a package. The package is dried at a temperature greater than the boiling point of water, preferably at about 230° F. to 265° F. to drive out the water and to prevent bacterial growth on the sized package. When the package is not dried, but is used within a short time in a twisting or plying operation, water is driven off the strand as it is whipped about by the apparatus at high speeds and at room temperature.

Although it is not necessary to use a collapsible container in order for our method to be practiced, it is preferable where a high degree of flexibility is required in supplying various chemical treatments at different times to the pumping station. Otherwise, an enclosed, noncollapsible container is sufficient.

It is one theory that when bacteria attacks a sizing material containing starch, the latter is converted to a sugar, which changes the intended properties of the sizing material so that the glass fiber strand is not protected, thereby leading to fuzz. Furthermore, when glass fibers, subjected to bacterial attack, are heat-cleaned, streaking in glass fabric results. It is known that when sugar is burned, carbon is formed, and if sugar is on the fabric it is extremely difficult to burn off.

Sometimes on a glass fiber fabric which has been inflicted with bacteria or fungi, areas of different colors such as reds, blues, browns, appear or spotting occurs; this is also thought to be caused by a conversion of starch to sugar.

The bacteria and/or fungi problem that arises when starch sizes are used is not new to the art. Antifungi agents such as tri-butyl tin oxide have been used in the past, but bacteria and fungi have now become partially immune to these agents. Heat, over 140° F., has also been applied to the sizing materials to destroy bacteria and fungi but some sizes have to be applied at room temperature.

With liquid sizes, such as used in the art, a closed system could not be used, since the application efficiency of the size to the fibers is very low, thereby requiring an overflow tank and return line. Preciseness in the delivery of a liquid size is not possible and furthermore, the size picks up contaminants from the atmosphere and thereby exposes the supply thereto.

An auxiliary feature of using our supply and delivery system is that air in the form of bubbles is kept out of the system which means that the applicators will not develop bubbles. This is important since bubbles break when a glass filament comes in contact therewith, to create an uneven film or void on the applicator, thereby leaving some filaments substantially void of any size along a substantial length of continuous strand.

DESCRIPTION OF THE PREFERRED EMBODIMENTS

The nature of the present invention will be more fully understood from the following description wherein reference is made to the drawings.

Figure 1:
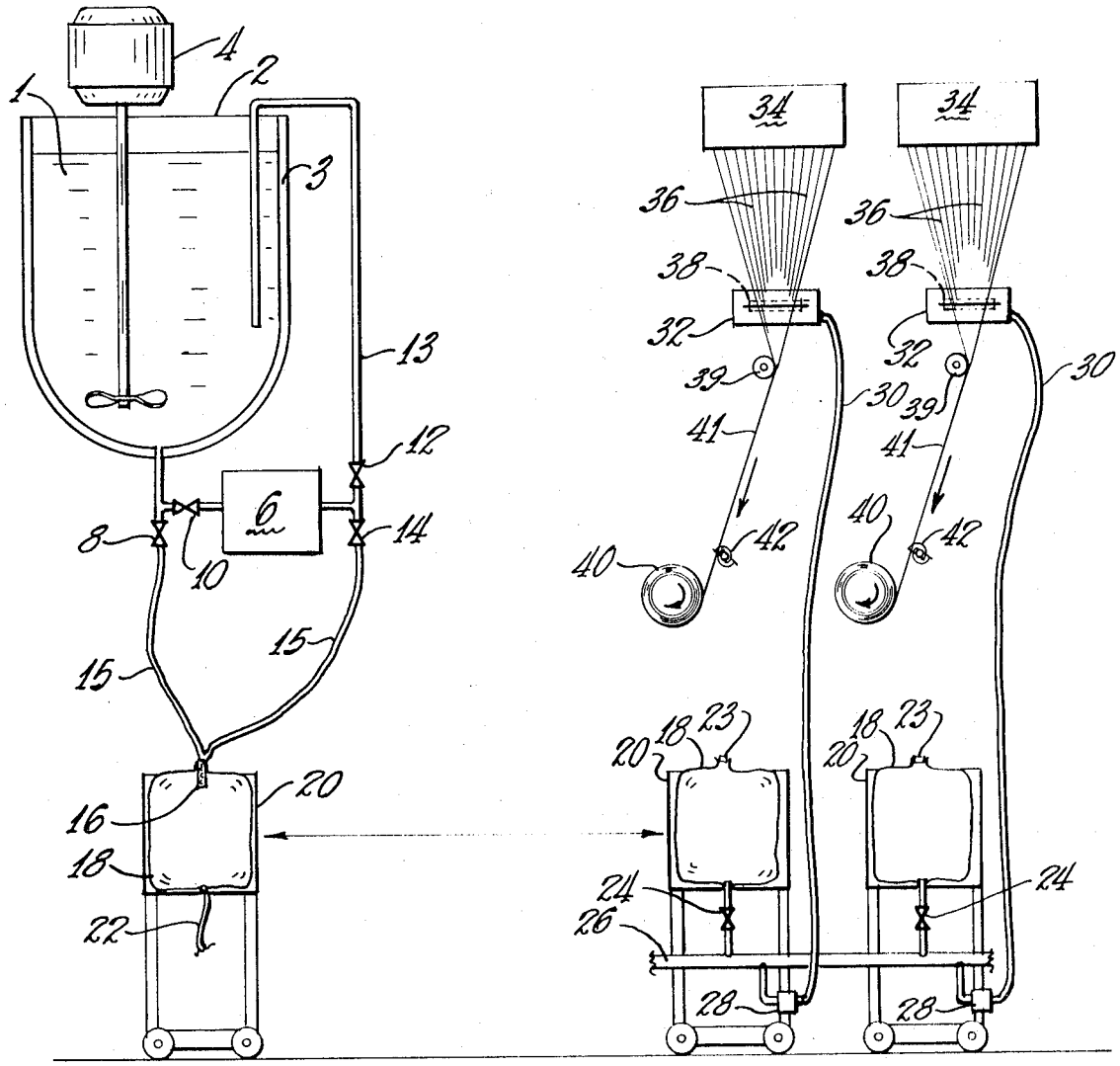
FIG. 1 is a schematic view, partly in cross section, which shows the making of a chemical treatment, the storing of the treatment in a collapsible container, transporting the treatment to a pumping station, pumping of the treatment to an application zone, applying the treatment to glass fibers as they are formed and winding the treated fibers onto a package.

Constituents that make up a chemical treatment 1 for application to glass fibers are mixed in a vessel 2 as shown in FIG. 1, which is equipped with a water jacket 3 so that the temperature of the contents within the tank 2 may be raised, lowered or maintained as desired. The tank is also equipped with a high speed mixer 4. For some chemical treatments 1 a high shear device 6, e.g., a homogenizer, is required to reduce the particle size of the treatments 1 and also to homogenize the treatments. When the high shear device 6 is used, cutoff valve 8 is closed and valve 10 is opened to allow the treatment 1 in the vessel 2 to pass through the high shear device 6. A return line 13, from the high shear device 6 to the vessel 2 is provided so that multiple passes of the treatment 1 may be made therethrough. Load-out hoses 15, 15 are provided after and adjoining valves 8 and 14. The load-out hose 15 is equipped with a strainer 16 having 40–100 mesh screen.

When the chemical treatment 1 is thoroughly mixed, it is passed through strainer 16 and into a collapsible container 18, preferably a polyethylene bag, which is housed in a metal castered box 20. The metal castered box 20 has a small opening in its bottom surface to allow a flexible tubing 22 that is connected to the container 18, to be passed therethrough. When the collapsible container 18 is completely full it is fitted with a snap-on cap 23 so that the treatment 1 therein is protected from contaminants, oxidation and bacteria. From this point in time the chemical treatment 1 is not exposed to the elements until it is subsequently applied to glass fibers.

The metal castered box 20 is transported to a pumping station which is used to deliver the chemical treatment 1 to an applicating zone. The pumping station comprises a manifold 26 which is supplied by controlling the flow of the treatment from the collapsible container 18 with a supply valve 24. There is no limit as to the number of supply valves that may be attached to the manifold 26 from other containers 18, but rather is dependent upon the number of positive displacement pumps 28, and the rate of flow of the treatment 1 to the applicating zone.

Flexible tubing 30 is fitted to each pump 28 so that the treatment 1 is delivered to an applicator device 32. The applicator device 32 comprises an opening for entry of the treatment 1, preferably in gelled form, and a chamber to receive the treatment. An applicator roll 38 is mounted within the device 32 so that two narrow slots are formed between the roll 38 and the chamber containing the treatment, wherein the slots extend along the length of the roll. By the action of the roll, which is rotating by means of a motor or as a result of a fan of glass fibers 36 being formed from a precious metal bushing 34 containing molten glass, and passing in contact with roll 38, the gelled treatment 1 momentarily becomes a liquid and coats the applicator roll 38 with a uniform film of the treatment. As long as the roll 38 is rotating, the treatment 1 on the roll 38 remains a liquid as does that part of the treatment 1 in the chamber of the applicator device 32 that actually contacts the rotating roll 38. However, when the roll 38 is not rotating the treatment 1 coating the roll 38 reverts back to the gel form until the glass fibers, through a shearing action, transform the gel again to a liquid to coat the fibers with a uniform film. Again, the treatment reverts back to the gel form just after application to the glass fibers. The individually coated glass fibers are collected into a strand 41, by means of a grooved graphite wheel 39, and wound onto a forming package 40, by means of a traversing device 42, such as spiral wire traverse. The package 40 is then ready for postforming operations or for drying so that it can be stored without fear of picking up any bacteria from the environment.

Figure 2:
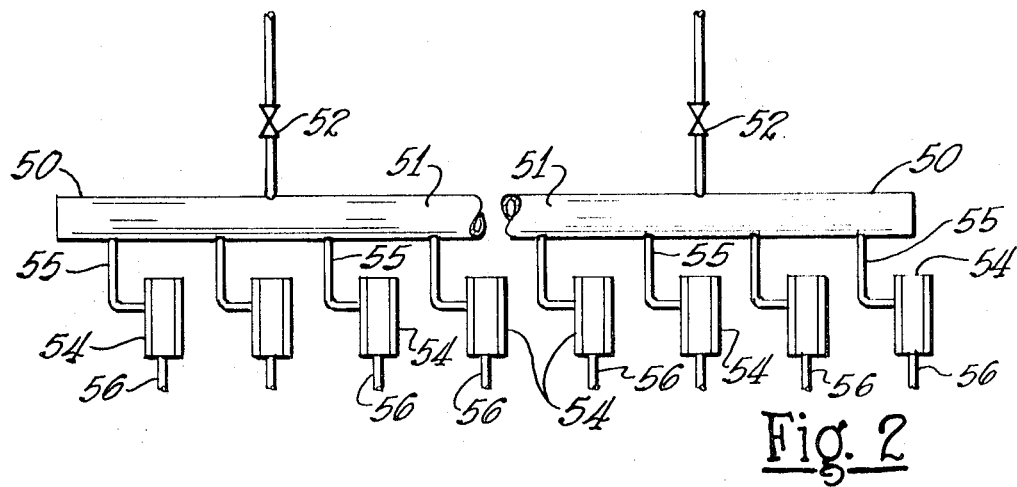
FIG. 2 is a fragmentary, enlarged view of a pumping station used to deliver chemical treatments to an applicating zone.

In an enlarged view of the pumping station, FIG. 2 shows the manifold 50 with supply valves 52, 52 regulating the flow of the chemical treatment 51 so that the positive displacement pumps 54 can draw the treatment 51 through flexible tubing 55 attached to the manifold 50 and forward it through additional flexible tubing 56 to the applicating zone.

Figure 3:
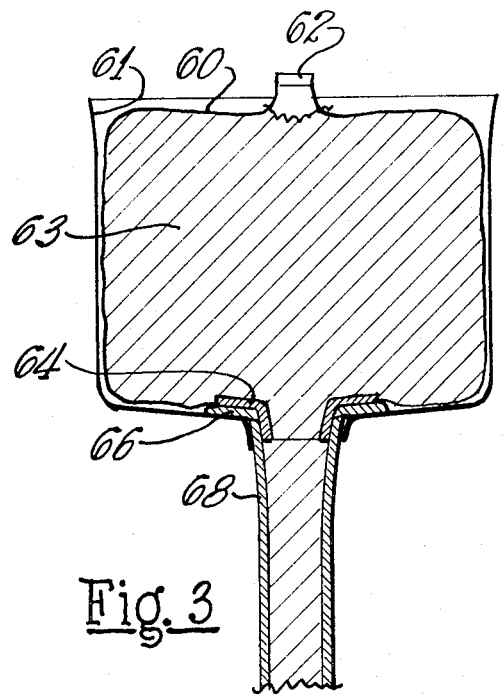
FIG. 3 is a fragmentary, enlarged cross-sectional view of a collapsible container supported in a carriage, which houses a chemical treatment to be used on glass fibers.

FIG. 3 shows a collapsible container 60 substantially filled with a chemical treatment 63, securely sealed with a cap 62, wherein the container occupies substantially the internal confines of the metal box 61 (the casters for the box are not shown). A hollow flanged nipple 64 is fitted on the container 60 so that the nipple 64 protrudes through the container and is seated on an oversized nylon washer 66, which helps to prevent abrasion of the container at the opening of the metal box 61. Flexible tubing 68 is then fitted over the nipple 64 so that the chemical treatment 63 can be advanced to the manifold, the latter not being shown.

The size of the collapsible container 60 must be adjusted so that stresses therein, which are set up on transporting the castered metal box 61, do not rupture the container 60.

Although a specific method has been disclosed, it is to be understood that variations and modifications can be made within the spirit and scope of the invention.

We claim:

1. In a method of preparing and handling an reversible shear-thinning gel composition for application to glass fibers, comprising the steps of:
   a. adding constituents to a vessel to form the composition;
   b. mixing the constituents with a high shear device to reduce particle size and to ensure a homogeneous composition;
   c. applying the homogeneous composition to a plurality of advancing individual glass filaments so that the linear movement of the filaments moving in a cooperating relationship with the composition momentarily converts the composition into a liquid which coats the filaments uniformly and then immediately thereafter reverts back to a gel on the filaments;
   d. gathering the glass filaments with the composition thereon into a multifilament strand;
   e. collecting the multifilament strand on a package; and
   f. drying the package to drive out water therefrom and to prevent bacterial growth thereon;

the improvement comprising:
   g. straining the homogenous composition into a collapsible container so that when filled, the container is substantially free of air;
   h. sealing the filled collapsible container so that the homogeneous composition may be withdrawn therefrom at a subsequent time without contamination by dirt, bacteria or oxidation;
   i. conveying the sealed container to a pumping station equipped with a receiving manifold and a plurality of positive displacement pumps;
   j. supplying the manifold with sufficient homogeneous composition from the sealed container without having to expose the composition to the atmosphere; and k. pumping the homogeneous composition from the manifold to an applicating zone via one-way positive flow, wherein the composition is in a closed system from the straining step (g) through the pumping step (k).

2. The method as claimed in claim 1 wherein the delivery of the composition to the applicating zone for application of the composition to the glass filaments is precisely controlled so that the composition solids are uniform throughout the length of the glass filaments.

3. A method of providing flexibility and a high degree of preciseness in a closed system delivery of a reversible-shear-thinning gel composition used to size glass fibers, comprising the steps of:

a. introducing the composition through a strainer into a collapsible container until the container is full and void of air, said container having a tubing and a control valve thereon, to allow the composition to be subsequently withdrawn therefrom;

b. closing the container so that the composition is protected from the contaminates, oxidation, and bacteria;

c. advancing the closed container to a central pumping station comprising a manifold and a plurality of positive displacement pumps;

d. supplying the manifold with sufficient composition from the closed container by controlling the valves on the tubing wherein the composition is not exposed to the elements; and e. controllably pumping the composition from the manifold via said positive displacement pumps to an applicating zone, wherein glass fibers upon formation come into contact with an applicator that applies the composition uniformly to the fibers;

so that as the composition is first exposed to the atmosphere via the applicator as in step (e) it is consumed substantially immediately by the advancing glass fibers.

* * * * *